United States Patent

Sinko

Patent Number: 5,529,811
Date of Patent: Jun. 25, 1996

[54] TANNIN STAINING AND FUNGUS GROWTH INHIBITOR PIGMENT AND MANUFACTURING PROCEDURE

[75] Inventor: John Sinko, Glendale, Wis.

[73] Assignee: Wayne Pigment Corp., Milwaukee, Wis.

[21] Appl. No.: 367,100

[22] Filed: Dec. 30, 1994

[51] Int. Cl.$^6$ .................................................. B05D 1/18
[52] U.S. Cl. ........................ 427/440; 106/419; 423/368
[58] Field of Search ..................... 106/419; 423/368; 427/440

[56] References Cited

U.S. PATENT DOCUMENTS 5,176,894  1/1993  Sinko ........................ 423/368
5,314,532  5/1994  Hughes et al. ............ 106/419 X
5,378,446  1/1995  Sinko ........................ 423/368

Primary Examiner—Michael Lusignan
Attorney, Agent, or Firm—Ryan, Maki, Mann & Hohenfeldt

[57] ABSTRACT

A process of inhibiting of the staining of a film forming finish applied to a tannin containing wood substrate includes the step of applying to the wood substrate prior to or concurrently with the film forming finish, a protective coating containing an effective amount of zinc cyanamide to inhibit the migration of tannins from the substrate into the finish.

13 Claims, 3 Drawing Sheets

IR SPECTRUM OF ZEOLITE/$Zn$ NCN (7) COMPOSITE (EXAMPLE #3)

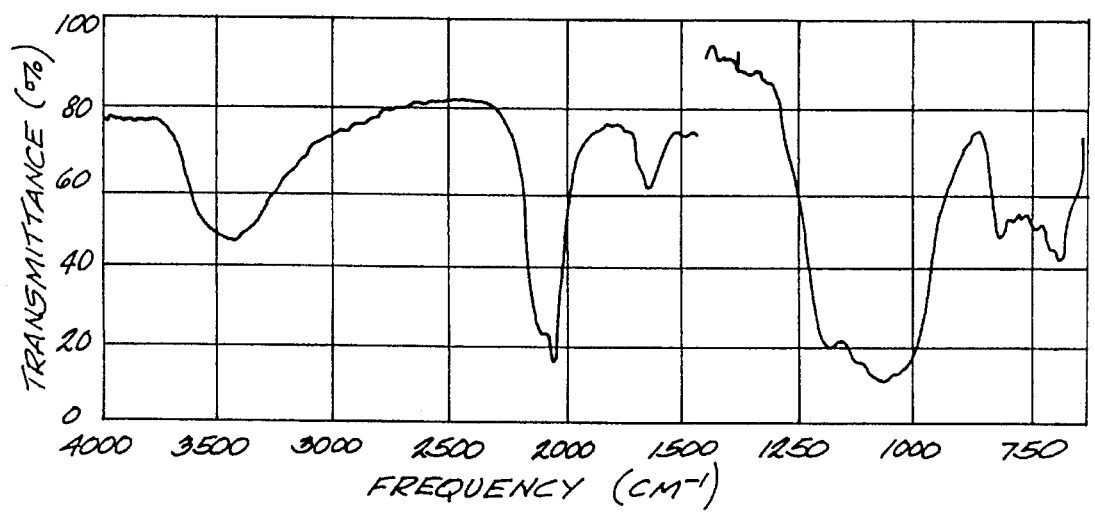
FIG. 1 IR SPECTRUM OF ZEOLITE/Zn NCN (T) COMPOSITE (EXAMPLE #3)
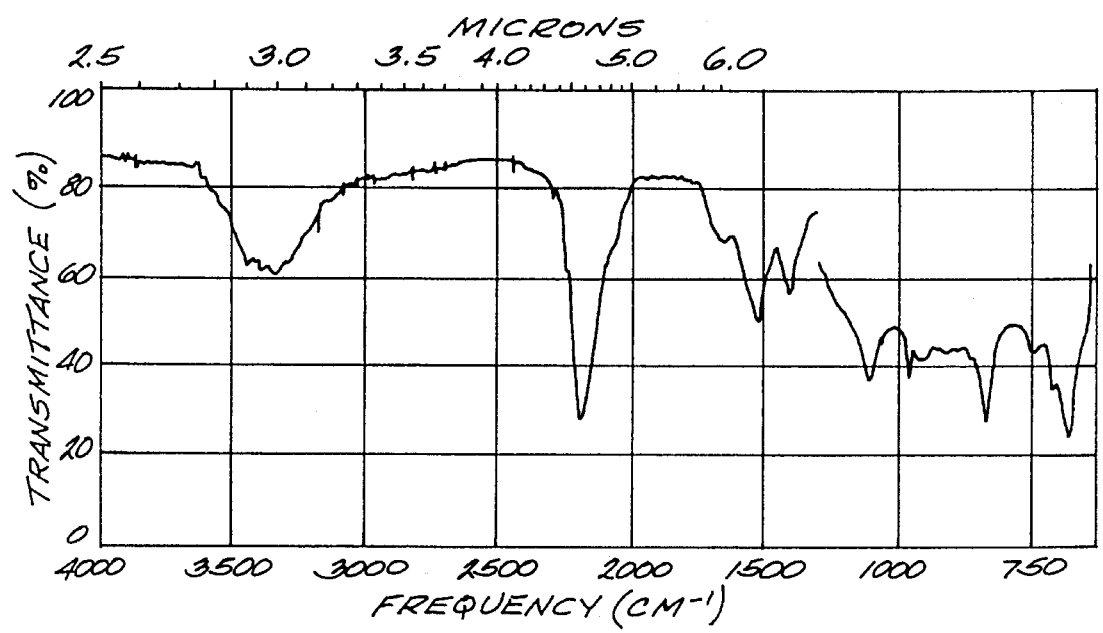
FIG. 2 IR SPECTRUM OF BASIC $ZnCO_3$/ZnNCN (a-T) (EXAMPLE #2)

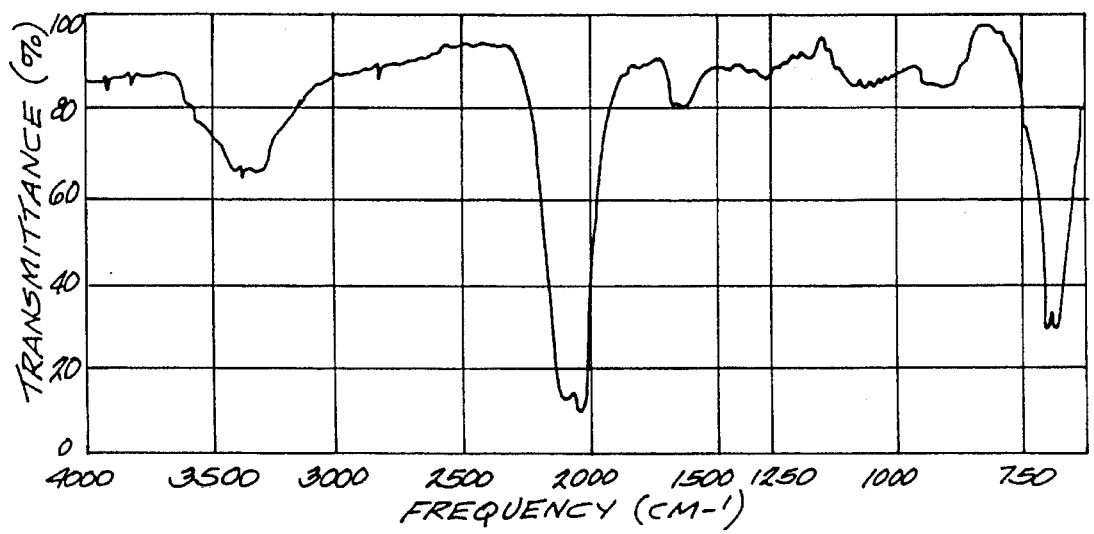
FIG. 3 IR SPECTRUM OF BASIC ZnNCN (T) (EXAMPLE #4)
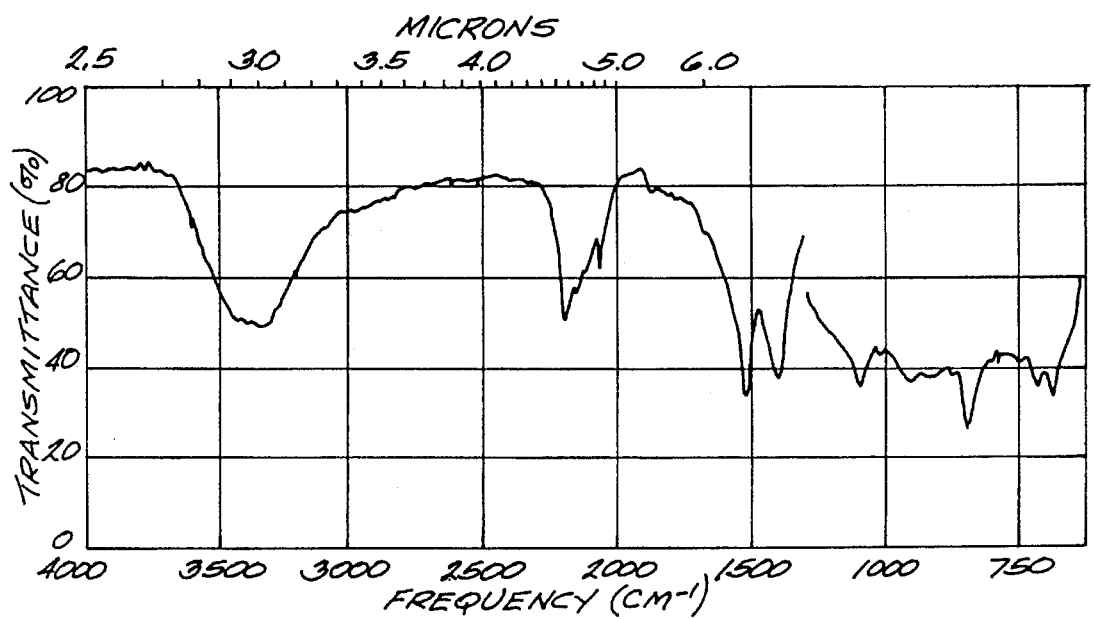
FIG. 4 IR SPECTRUM OF BASIC ZnCO₃/BASIC ZnNCN (α-T) (EXAMPLE #5)

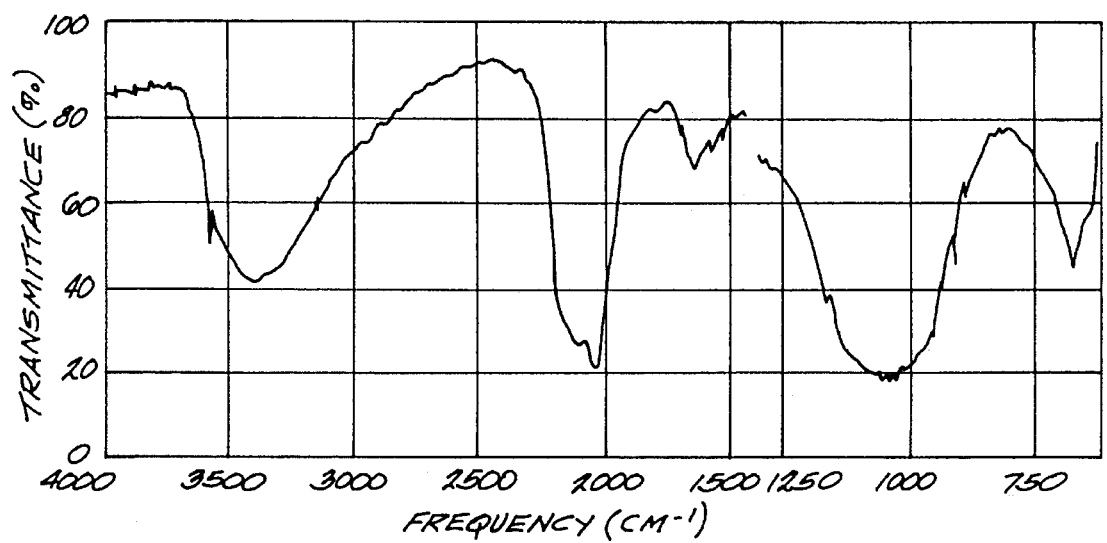
FIG. 5 IR SPECTRUM OF $Zn(HPO_4)_2$/BASIC $Zn NCN$ (T) (EXAMPLE #9.1)

TANNIN STAINING AND FUNGUS GROWTH INHIBITOR PIGMENT AND MANUFACTURING PROCEDURE

BACKGROUND OF THE INVENTION

Tannin staining, an undesirable process which results in aesthetic degradation and loss of decorative value of protective coatings is a problem frequently encountered, for example, with white coatings applied on wood substrates. It is observed usually as yellow-brown coloration or as randomly distributed brown colored spots on freshly applied aqueous white coatings and more particularly, on white coated wood substrates exposed to high, typically condensing, humidity conditions.

Water soluble tannins or tannic acids, natural compounds of complex and non-uniform composition, are the staining species involved, which are abundantly present, especially in redwood substrates.

A significant example of such materials is the group known as hydrolyzable tannins which are esters of hexozes (normally glucose) formed with benzoic acid or its derivatives in variable mole ratios. Their complex chemical composition and structure is consistent with their intricate chemical behavior and physical properties, some of which are relevant to the tannin staining process, i.e.: solubility in water and polar organic solvents, tendency to darken in the presence of air (more specifically in alkaline media) and to form soluble or insoluble, usually dark colored combinations with various metal cations. Similarly, the formation of colored tannate species are observed in the presence of insoluble or partially soluble, various (pigment grade) mineral products, in which case, apparently, the anionic species involved interfere as well with the related process. Notably, tannins' mild acidic character is also well known.

A complex phenomenon, tannin staining includes several concurrent processes: water or vapor penetration of wood substrates, solubilization, diffusion into the coating and darkening of the deposited air-exposed tannin species, among others. It is significant to observe in this sense that the rate of staining is diffusionally controlled and its extent is significantly dependent on the substrate's tannin concentration.

By definition, staining inhibition in the above specified sense implies such capacities of the specialized coating systems, as to interact with dissolved tannin species and to interfere with related diffusion processes, thus causing "in situ" immobilization of the formers and resulting in overall obstruction of the staining process.

There are specialized pigment grade products known by the prior art as "blockers of tannin" or "stain inhibitors", which as functional components of water or solvent based paint formulations, provide such protective capacity to white coatings systems applied on wood substrates. Also used for this purpose, for example, are pigment grade Bametaborate, known in the prior art, or $Mg(OH)_2$ which is recommended as a stain inhibitor by U.S. Pat. No. 4,218,516, issued Aug. 19, 1980. Also, U.S. Pat. No. 3,846,148, issued November 1974, discloses the chemical composition and manufacturing procedure of such products, comprising base pigments which essentially consist of wollastonite, talc or mica in combination with phosphate or borate of Ca or Zn and as a doping agent or active additive, one amphoteric metal hydrate of Al, Ti, Zr, Zn or Si. While the above-identified '516 Patent, refers to all of the specified metal hydrates as amphoteric, it is believed that Si hydrate is typically acidic, whereas Ti and Zr hydrates are considered compounds of basic character. Consequently, the tannin stain blocking activity of pigment compositions, as claimed, is not necessarily correlatable with the components' amphoteric character. In a related sense, it will be also observed (as documented in the literature) that totally or partially dehydrated metal hydrates (such as alumina, silica, zirconia, etc., essentially the above-specified doping agents) are characterized by variable and considerable degrees of (Bronsted and Lewis) surface acidity. Based on that, it is reasonable to suppose that no significant chemical reaction could occur between such substrates, characterized by surface acidity and dissolved, weakly acidic tannin species, and thus it is believed that the stain blocking capacity of composite pigments according to the above identified U.S. Patent results primarily from their barrier function and absorption capacity.

It can be concluded that stain inhibitors containing the specified metal hydrates as functionally active additives, according to the above identified U.S. patent, function essentially by reducing the permeability of coating systems and, thus display relatively limited tannin stain inhibitive capacity.

SUMMARY OF THE INVENTION

It was learned according to the present invention that white pigment grade zinc cyanamide products obtained pursuant to my U.S. Pat. Nos. 5,176,894, issued Jan. 5, 1993, or patent application Ser. No. 195,783 filed Feb. 14, 1994, now U.S. Pat. No. 5,378,446, issued Jan. 3, 1995, displays remarkable tannin stain inhibitive activity as a functional pigment component of wood protective coatings. It will be noted in this respect, that the chemical aspects of interaction of solid ZnNCN with solubilized tannin species has not been heretofore documented in the scientific literature.

Any attempt, however, to explain the remarkable stain inhibitive capacity of pigment grade ZnNCN, as disclosed hereinafter, should consider, in addition to the barrier function thereof, the possibility of chemical interaction thereof with dissolved tannin species. Taking into account the relative strength of the involved acids (comparatively acidic tannin species and weakly acidic $H_2NCN$, characterized by $K=4.04\times10^{-11}$ respectively) this postulated chemical interaction appears plausible, logically resulting in free $H_2NCN$ and more specifically of insoluble, light colored tannates which ultimately are accountable for the effective immobilization of dissolved tannin species "in situ" by ZnNCN containing protective coatings. In this sense, it will be observed as well, that free $H_2NCN$ thus generated is quite reactive and presumably able to further interfere with such intricate staining processes.

In conclusion, it is reasonable to suppose that complex blocking mechanisms, including chemical interactions, as above discussed, are accountable for the effective tannin staining inhibition capacity of pigment grade ZnNCN, and thus for the remarkable service of wood protective coating formulated with such products.

Service conditions (high humidity, warm microclimate) which promote tannin staining, also support the growth of various fungi (including mold and algae) which typically form colonies of dark color on attacked surfaces causing aesthetic degradation and accelerated physical breakdown of the coating systems and ultimately of the protected wood substrates. Consequently, fungus growth control capacity is considered an essential function of modern paint and coating formulations intended for wood protection, which extend the service life and improve the overall protective performance of such systems. Typically, fungicides of various chemical composition and toxicity, are employed as special paint additives to increase fungal growth inhibition capability of wood protective coatings containing traditional stain inhibitor pigments.

Briefly, in accordance with the invention there is provided a process of inhibiting of the staining of a film forming finish applied to a tannin containing wood substrate includes the step of applying to the wood substrate prior to or concurrently with the film forming finish, a protective coating containing an effective amount of zinc cyanamide to inhibit the migration of tannins from the substrate into the finish.

In addition to wood substrates, the compositions and process of this invention have also been found effective in blocking other stains, for example, those caused by smoke damage on structural materials such as drywall, or graffiti coverage. Stain blockers in accordance with the invention include at least one, and preferably more than one, white colored stain blocking component selected from the group consisting of zinc cyanamide, calcium cyanamide, magnesium cyanamide, strontium cyanamide, zinc carbonate, cerium carbonate, zirconium carbonate, calcium carbonate, strontium carbonate, zirconium phosphate and titanium phosphate.

BRIEF DESCRIPTION OF THE DRAWINGS

FIGS. 1, 2, 3, 4 and 5 are reproductions of IR spectra obtained by analysis of compositions produced by various specific Examples set forth hereinafter.

DETAILED DESCRIPTION

It was learned according to the present invention, that pigment grade ZnNCN displays dual functionality as a component of wood protective coatings: more specifically, in addition to tannin staining inhibition, it presents remarkable fungus growth control activity, as well. As a consequence, ZnNCN, by providing both protective qualities, contributes considerably to the overall service performance of such coating systems.

It is preferred according to the present invention to prepare pigment grade ZnNCN by wet procedures, such as those disclosed in my U.S. Pat. No. 5,178,894, issued Jan. 5, 1993, and U.S. patent application Ser. No. 195, 783 filed Feb. 14, 1994, now U.S. Pat. No. 5, 378, 446, which typically are characterized by high assay, narrow particle size distribution, high specific surface area and relatively "open", porous texture The chemical composition of such products, considered "neutral" zinc salts of di-basic H2NCN is consistent with ZnNCN formula. Depending on the manufacturing process, however, ZnNCN is obtainable in "typical" or "atypical" (symbolized hereafter by (T) or (A-T), respectively) crystal form (as disclosed in the above identified U.S. Patent Application).

It was also learned pursuant to the present invention that the "basic" zinc salt of $H_2NCN$, which is further referred to as basic zinc cyanamide, displays a tannin staining and fungus growth inhibitive activity as a pigment component of wood coating formulations. The chemical composition of basic zinc cyanamide is consistent with a $ZnNCN.ZnO.H_2O$ formula. It is obtainable in pigment grade quality essentially by reacting dispersed and hydrated ZnO, in an aqueous medium, with $H_2NCN$ at appropriate stoichiometrical ratio, according to:

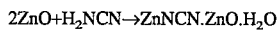

$$2ZnO + H_2NCN \rightarrow ZnNCN.ZnO.H_2O \qquad 1.$$

A detailed description of the manufacturing procedure and pertinent analytical data are presented in Example No. 4.

It will be observed that basic zinc cyanamide, similarly to neutral ZnNCN, can be obtained in both "typical" (T) or "atypical" (A-T) crystal form, identifiable by characteristic IR spectra, as disclosed in aforementioned U.S. patent application Ser. No. 195,783. Predictably, Reaction 1 yields the former, whereas partially carbonated ZnO (as aqueous suspension, subject to similar reaction conditions) even at as low as 2–3% $ZnCO_3$ content, is the typical precursor of the latter crystal structure. The $ZnNCN.ZnO.H_2O$ formula, which is in agreement with obtained analytical data, suggests the presence of free ZnO as a constituent of such products. The chemical behavior of basic zinc cyanamide, however, is inconsistent with that: as for example, it was observed, according to the present invention, that an aqueous suspension of the freshly formed compound, unlike ZnO, does not react with gaseous $CO_2$ to form basic zinc carbonate. Nevertheless, basic zinc cyanamide is readily convertible into neutral zinc cyanamide according to:

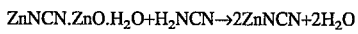

$$ZnNCN.ZnO.H_2O + H_2NCN \rightarrow 2ZnNCN + 2H_2O \qquad 2.$$

The initial objective of the present invention to develop composite pigment systems was to maximize the active ZnNCN phases's specific surface area by incorporation of finely divided support constituents. The development of ZnNCN based composite pigments characterized by synergistic behavior in respect of tannin stain inhibitive activity is an object of the present invention.

In accordance with a related aspect of the invention, specifically prepared or commercially available products, characterized by adequate physical, (i.e. white color), and chemical properties and able to promote synergy as support constituents of ZnNCN based composite pigments, are identified.

Several pigment grade white extenders of various chemical compositions were incorporated in composite pigments according to the invention and evaluated for their synergistic contribution to the tannin staining inhibitive activity of the related composites. In accordance with the invention it was learned that ZnNCN, or basic zinc cyanamide, is generally compatible, as expected, with extenders of various chemical compositions and crystal structure; several tested extenders, however, displayed no synergistic behavior in the above-specified sense or actually did affect unfavorably the overall tannin stain inhibitive activity of the pertinent composite pigments. In this respect it will be observed that a few mineral fillers widely used by the paint industry, i.e. talc, chlorite (hydrous magnesium aluminum silicate), MgO, as well as wollastonite (calcium silicate), were found to belong to the latter category; apparently $Mg^{2+}$ and/or silicate species released by these products into the staining process are accountable for the noticeable adverse interference with the tannin stain inhibitive activity of ZnNCN, the active component of the composite pigments. Furthermore, no significant synergy was observable in relation to pigment composites (according to the present invention) containing $TiO_2$ (Rutile), precipitated $BaSO_4$, mica, silica, kaolin clay (hydrated aluminum silicate), nepheline syenite (anhydrous sodium potassium aluminum silicate) or $Zn_3(PO_4)_2.2H_2O$, $SrHPO_4.H_2O$, $MgHPO_4.H_2O$, $Ca_3(PO_4)_2$, as well as precipitated $CaCO_3$, $SrCO_3$. Nevertheless, composites comprising the above-enlisted support constituents are generally characterized by excellent pigmentary properties, comparable to ZnNCN in respect to tannin stain inhibition. Several products of various chemical composition and appropriate physical properties (solubility, color) were identified according to the present invention to function as synergistic substrate constituent of ZnNCN based composite pigments. In intricate physical association with ZnNCN, or basic zinc cyanamide, such products form solid composite systems, characterized by excellent overall pigmentary properties, which typically display fungus growth control activity and synergism in respect to tannin stain inhibition. It was learned, pursuant to the present invention, that few selected carbonates characterized by appropriate color and solubility, and more specifically: basic zinc carbonate, basic zirconyl carbonate and $Ce^{3+}$ or $La^{3+}$ carbonate display synergy in the above-specified sense. It will be observed that carbonates typically are non-reactive under the reaction conditions subsequently specified. In this sense, however, basic zinc carbonate (dry product normally corresponds to $ZnCO_3.1.6Zn(OH)_2.0.6H_2O$ formula and contains approximately 40–42% $ZnCO_3$) represents a "non-typical" case: as disclosed in my U.S. patent application Ser. No. 195,783, it does react with $H_2NCN$, forming ZnNCN and $CO_2$; consequently, it is employed pursuant to the present invention in appropriate stoichiometrical ratio. Basic zirconyl carbonate, unlike basic zinc carbonate, does not react with $H_2NCN$; it is characterized, however, by limited heat stability, being convertible by drying (performed at moderate temperature ranges of 80°–100° C.) into zirconium oxide (hydrated to variable degrees) and ultimately into $ZrO_2$ with total loss of carbonate content. It was observed pursuant to the present invention that pigment composites containing basic zirconyl carbonate as a support constituent, dried at the same moderate temperature conditions, retain a relatively high carbonate content, presumable due to a stabilizing effect of the related matrix. Lanthanide carbonates, corresponding to $Ln_2(CO_3)_3.3–4\ H_2O$, where $Ln=Ce^{3+,}\ La^{3+,}$ and more preferable $Ce_2(CO_3)_3.3H_2O$, are non-reactive as well, in the above-specified sense. Commercially available $Ce^{3+}$ carbonate (from Molycorp., Inc.), a relatively heat stable product, usually characterized by variable carbonate content (due to the presence of $Ce^{4+}$, as well as the bicarbonate or basic carbonate species), is applicable as support constituent of pigment composites according to the present invention. Efficient U.V. radiation absorbers (300–400 nm range) cerium compounds are known inhibitors of photo degradation processes of various, specifically organic, mediums. Presumably ZnNCN based pigment composites, containing cerium carbonate as support constituent, additionally to tannin stain inhibiting and fungus growth control activity, provide improved photostability to coating systems by inhibiting the degradation of related resin matrixes. Additionally to carbonates as above-specified, selected phosphates, hydrated metal oxides and Zeolites or molecular sieves were identified as synergistic support constituents of pigment composites according to the present invention. $Ti(HPO_4)_2.H_2O_x$ and more specifically, $Zr(HPO_4)_2.H_2O_x$ known for its layered structure, ion exchange capacity and ability to form intercalates with organic species, along with NaY or HY of ZSM-5 type molecular sieves or Zeolites of various Si/Al ratios, characterized (preferable but not exclusively) by large intersecting pore system and related absorption capacity, as well as hydrated aluminum oxide, $Al(OH)_3$ and hydrated Zirconium oxide, were found to display synergy in association with ZnNCN or basic zinc cyanamide in the above specified respect.

In order to achieve intimate association between ZnNCN, the active component and the support constituent of such composite pigment, the former typically was prepared by gradual and simultaneous introduction of $H_2NCN$ and ZnO suspension, into well dispersed aqueous suspension (containing the whole amount) of the latter.

It will be observed, however, that, when applicable, "in situ" and concurrent formation of both phases, the active component and the support constituents, is the preferred procedure of ZnNCN based composite pigment synthesis according to the present invention.

As for example, a previously prepared aqueous mixed suspension of ZnO and MeO (carbonate precursor) is simultaneously converted into ZnNCN and $MeCO_3$ (or basic carbonate) respectively, by concurrent introduction of $H_2NCN$ and $CO_2$ gas into the reaction system as follows:

$$ZnO+MeO+H_2NCN+CO_2 \rightarrow MeCO_3/ZnNCN+H_2O \qquad 3.$$

An essentially similar principle (as will be later exemplified) can be alternatively realized by precipitation of selected carbonates, phosphates or hydroxides, mixed with previously dispersed ZnO and by subsequent conversion of the latter into ZnNCN. Support constituents or their precursors, when applicable, are employed according to the present invention in finely divided form, characterized by average particle size of 1–10 nm.

It was subject of consideration to optimize the support constituent/active component ratio of the composite pigments: no measurable benefit in respect of functional activity was observable, however, at or above 50% of support content levels.

EXAMPLES

For simplicity reasons with no intention however to limit the applicability of the present invention, all examples hereinafter presented disclose manufacturing procedures of composite pigments having the support constituent content limited to practically one selected value, typically of 30–40% by weight.

Various pigment components realized pursuant to the present invention, are symbolized by a "phase composition" formula, which identifies the support constituents' chemical composition (basic or neutral) and crystal structure (typical(T) or atypical (A-T)) of the zinc cyanamide phase.

In order to maximize the ZnO→ZnNCN conversion, optimal process conditions were applied: approximately 10% molar excess of $H_2NCN$ (except in the case of basic zinc cyanamide), 70°–85° C. temperature range and intensive agitation. However, "in situ" preparation of the carbonate support constituents by gaseous $CO_2$ introduction into the reaction system was preferable performed at lower temperature range of 20°–50° C.

All synthesized composite pigments were analyzed for N, Zn, and carbonate contents (when applicable) by Kjeldahl, complexometric and gas volumetric analytical techniques, respectively.

Primer or topcoat paint formulations intended for wood protection are typically water based, often solvent based systems of considerably complexity. Such water based formulations usually contain water reducible alkyd or acrylic resins as film forming component, filler pigments and water as major components. They also contain several functional components such as: staining inhibitor pigment, coalescent solvent, dispersants, defoamers, thickeners, neutralizers and biocides in appropriate amounts.

All functional characteristics, including to some extent, tannin stain blocking capacity, of wood protective coatings are dependent on the major components' (such as fillers and polymer matrixes) chemical composition, respectively cross-linking density. It will be observed, however, it is the stain inhibitor pigment component, representing only about 5–6% of the solid phase, which determines the tannin stain blocking performance of the resultant coatings.

A primer formulation prepared in accordance with Example 11, with varieties of composite pigments obtained according to the present invention, was employed as a test system to estimate and to quantify the tannin staining inhibitor activity of such ZnNCN based products. To that purpose, the related variations of the primer formulation were applied by a 3 mil. let down bar on surface finished redwood panels, aged for several days and subsequently subjected to condensing humidity conditions for 24 hours. By measuring the magnitude of the resulted discolorations of the test panels by means of a computer assisted reflectance spectrophotometer, results were obtained and expressed in FMCII color measurement system versus related and unexposed control exhibits, where the pertinent formulations were applied on white non-staining substrates. The primer variations' protective performance and the pertinent composite pigment varieties' tannin staining inhibitive activities were thus evaluated and quantified. Fungus growth retarding activity of pigment grade ZnNCN and of selected ZnNCN based composite pigments were evaluated on pine and gypsum test panels as above described following the specialized test procedure recommended by ASTMD-3273.

Example 1

Composite pigments, characterized by excellent tannin staining inhibitive and fungus growth control activity were prepared, symbolized by phase composition formulas:

1.1: $Ce_2(CO_3)_3 \cdot 3H_2O/ZnNCN$ (T)

1.2: $Al(OH)_3/ZnNCN(T)$ 1.3: Molecular sieve Valfor CBV-400/ZnNCN(T).

The support constituents according to 1.1, 1.2, 1.3 are available from Molycorp, Inc., Nyco Minerals, Inc. and the PQ Corporation, respectively. The composites were synthesized pursuant to the following procedure:

Well dispersed and hydrated aqueous suspensions of selected varieties of the selected substrate constituents and separately, of highly reactive ZnO, were concurrently prepared by introducing in small increments 300.0 g. of any such product, as specified, and 543.0 g. (6.67 moles) of AZO 66 grade ZnO (from American Smelting and Refining Co.) respectively, onto two separate volumes of hot water 1,000 ml. each, by intensive stirring.

The dispersion and hydration process of all (various substrate constituents and ZnO) such suspensions was completed by maintaining the same conditions for one hour at 75°–85° C.

Subsequently, composite pigment varieties were produced by simultaneously introducing in about 60 minutes, the previously prepared ZnO suspension (as above described) and 313.0 g. (7.45 moles) of $H_2NCN$ (employed as aqueous solution of 25% available from S.K.W.—Germany) into the previously prepared, intensively stirred suspensions of any substrate constituent. The ZnO conversion into ZnNCN was finalized by keeping the same reaction conditions (intensive stirring, 75°–85° C.) for approximately 1 hour after the reactants introduction was completed.

Subsequently the solid phases of the resultant product suspensions were separated by vacuum filtration, and without washing, the obtained press cakes were dried at 105°–110° C. for 12 hours and pulverized to a fineness of 100% +270 mesh.

The process waters collected were entirely recyclable. Since the products selected as support constituents are essentially nonreactive under the above disclosed reaction conditions yields obtained were all approximately 1002.0–1060.0 g.

Pertinent analytical data typical for tannin staining inhibitor composite pigments 1.1, 1.2 and 1.3, all containing about 70% by weight of ZnNCN as active component and about 30% by weight of selected synergistic support constituent, are presented in Table 1.

TABLE 1

| No. | Phase Composition of Synthesized Pigments | Determined/Calculated Values of Quality Parameters | | | |
|---|---|---|---|---|---|
| | | N % | Zn % | Support % | Specific Gravity |
| 1.1 | $Ce_2(CO_3)_3 \cdot 3H_2O/$ ZnNCN(T) | 16.05 | 51.8 | 9.5(as $CO_3$) | 3.0 |
| 1.2 | $Al(OH)_3/ZnNCN(T)$ | 15.2 | 45.1 | 29.4 | 2.6 |
| 1.3 | CBV-400/ZnNCN(T) | 15.5 | 45.5 | 30.0 | 2.3 |

Yields obtained and the correspondent chemical compositions (based on the presented analytical data) are disclosed below:

| Chemical Composition of Synthesized Pigments | Yield, g. |
|---|---|
| 1.1: 0.09 $Ce_2(CO_3)_3 \cdot 3H_2O/ZnNCN \cdot 0.38ZnO$ | 1058.0 |
| 1.2: 0.73 $Al(OH)_3/ZnNCN \cdot 0.27ZnO \cdot 0.04H_2O$ | 1020.0 |
| 1.3: 30% CBV-400/ZnNCN$\cdot 0.26ZnO$ | 1002.0 |

IR Spectrum characteristic to 1.3, CBV400/ZnNCN(T) is presented in FIG. 1.

Example 2

Composite pigment corresponding to basic zinc carbonate/ZnNCN(A-T) was synthesized as follows:

Basic zinc carbonate (which corresponds to $ZnCO_3 \cdot 1.6Zn(OH)_2 \cdot 0.6H_2O$ as available from Aldrich Chemical Co.) suspension was prepared by dispersing 1050.0 g. of finely ground material in 2000 ml. intensively stirred hot water and by keeping the same conditions at 75°–85° C. for 1 hour.

Composite pigment according to the present invention, was synthesized by introducing in about hour, 306.0 g. (7.28 moles) of $H_2NCN$, employed as 5% aqueous solution, into the previously prepared, intensively stirred basic zinc carbonate suspension, while keeping the temperature of the reaction mixture at 75°–85° C. The conversion process was finalized by maintaining the same process conditions for 1 additional hour.

The resultant pigment grade composite suspension was further processed in identical manner as disclosed in the relevant part of Example 1.

Pertinent analytical data typical for composite pigment containing ZnNCN (A-T) as active component and basic zinc carbonate as support constituent, (in this case in approximately 60% to 40% weight ratio, respectively) are presented below.

TABLE 2

| Analyzed/Tested Parameter | Determined Values |
| --- | --- |
| Specific gravity | 2.94 |
| N % as N | 16.22 |
| Zn % as Zn | 60.04 |
| $ZnCO_3$ % | 17.0 |
| Yield | 997.0 g. |

Based on the above presented analytical data the composite pigment's chemical composition corresponds to $ZnNCN.0.23ZnCO_3.0.35Zn(OH)_2.0.17H_2O$.

Relevant IR spectrum is presented in FIG. 2.

Example 3

Composite pigment of similar chemical composition and physical structure as disclosed in Example 1, corresponding to $CaCO_3/ZnNCN(A-T)$ phase composition formula, was produced by performing the synthesis of the active ZnNCN component and of the synergistic support constituent, simultaneously "in situ" of the reaction medium using the following procedure:

A well-dispersed, hydrated and reactive mixed suspension was prepared by introducing in small increments, 543.0 g. ZnO (AZO-66 grade preferable) and the appropriate amount, 168.0 g. of CaO, the carbonate precursor oxide, into intensively stirred 2000.0 ml. hot water at 75°–85° C.

The reactive mixed suspension of ZnO and CaO, the carbonate precursor oxide, was subsequently converted into composite pigment by introducing continuously for about 1 hour into the intensively stirred reaction medium, $CO_2$ gas at a manageable rate, and with approximately 5 minutes relative delay (but essentially simultaneously), 295.0 g. (7.0 moles) of HnNCN as 25% aqueous solution of the same quality as specified in Example 1.

Subsequently, the conversion process was finalized by keeping the temperature of the obtained suspension at 30°–40° C. and by continuous agitation for about 2 hours. More importantly, however, the reaction medium's pH were continuously monitored and periodically corrected to pH=7–7.5 by additional $CO_2$ introductions, performed intermittently, as necessary. Typically, after two hours stable pH=7–8 values of the reaction mediums were observed.

The obtained pigment composite suspension was further processed in identical fashion as discussed in the applicable section of Example 1. Relevant analytical data are presented below.

TABLE 3

| Analyzed/Tested Parameter | Determined Values |
| --- | --- |
| Specific Gravity | 2.64 |
| N % as N | 16.7 |
| Zn % as Zn | 42.16 |
| $CaCO_3$ % | 30.0 |
| Yield: | 997.0 g. |

Based on the above presented analytical data the composite pigment chemical composition corresponds to 0.5 $CaCO_3/ZnNCN(A-T).0.08ZnO.0.3H_2O$.

Example 4

Pigment grade basic zinc cyanamide, having chemical composition correspondent to $ZnNCN.ZnO. H_2O$, characterized by enhanced tannin staining and fungus growth inhibitive activity was produced according to the following procedure:

A well hydrated, reactive suspension, containing 407. g (5.0 moles) ZnO in 1000.0 ml. $H_2O$ was prepared in a similar fashion as disclosed in the correspondent part of Example 1, cooled to 30°–40° C. and subsequently converted to basic zinc cyanamide (suspension) by introducing into it in about 1 hour, 105.0 g. (2.5 moles) of $H_2NCN$, added as 25% solution, while keeping the temperature of the reaction medium at 20°–50° C. The conversion process can be finalized in about 1 hour at 20°–85 C. under intense agitation After separation, the solid phase was washed with limited amounts of $H_2O$, dried overnight at critical, 75°–80° C. and further processed as disclosed in the applicable part of Example 1.

Relevant analytical data and IR spectrum are presented below, respectively in FIG. 3.

TABLE 4

| Analyzed/Tested Quality Parameters | Determined Values |
| --- | --- |
| Specific Gravity | 3.38 |
| N % as N | 13.6 |
| Zn % as Zn | 62.6 |
| $ZnCO_3$ % as $ZnCO_3$ | 1% |
| $H_2O$ % | 10.5% |
| Yield: | 490.0 g. |

Based on the above presented analytical data, the chemical composition of the product corresponds to $ZnNCN.0.97ZnO..1.2H_2O$.

Example 5

Composite pigment correspondent to basic zinc carbonate/basic zinc cyanamide (A-T) was prepared according to the procedure as follows:

Well dispersed, hydrated and reactive suspension of ZnO was prepared by introducing 298.0 g. (3.66 moles, AZO 66 grade) of such product into 1500 ml. hot water of 75°–85° C., keeping the same conditions for one hour, then cooling it to about 40° C.

The prepared ZnO suspension was divided by weight into two parts, A and B, containing practically 178.0 g. and 120.0 g. ZnO, respectively.

Subsequently, B containing 120.0 g. ZnO was converted into basic zinc carbonate suspension by introducing continuously into it for about one hour, under intense agitation, $CO_2$ gas at manageable rate.

A mixed ZnO—basic zinc carbonate suspension was obtained by unifying A and B, which, first heated to 70°–80° C., was further converted into composite pigment suspension.

To that purpose, under intense agitation and at 70°–80° C., 48.0 g. (1.14 moles) of $H_2NCN$ (as 25% aqueous solution) were introduced into the mixed suspension in about 15–20 minutes. The conversion process was finalized by keeping the same conditions for one additional hour, and subsequently, the obtained composite pigment suspension was processed in identical fashion as presented in the applicable part of Example 1.

Relevant analytical data are presented below:

TABLE 5

| Analyzed/Tested Parameter | Determined Values |
| --- | --- |
| Specific Gravity | 2.92 |
| N % | 7.91 |
| Zn % | 61.15 |
| $ZnCO_3$ % | 23.7 |
| Yield: | 379.1 g. |

Based on the above presented analytical data, the composite pigment's chemical composition corresponds to: 0.67 $ZnCO_3.0.64$ $ZnO.0.2H_2O/ZnNCN.$ $ZnO.H_2O$.

Related IR spectrum is presented in FIG. 4.

Example 6

Composite pigment corresponding to basic zirconyl carbonate/ZnNCN (T) phase formula, was obtainable according to as follows:

Well dispersed, hydrated and reactive ZnO suspension, containing 220.0 g (2.7 moles) such product in 1000 ml. $H_2O$, was prepared in the above already presented typical fashion.

Concurrently, zirconyl sulfate solution was prepared by dissolving 245.0 g. of such product (available from Magnesium Elektron, Inc. as $H_2ZrO(SO_4)_2.3H_2O$, assay: 32% $ZrO_2$) in approximately 1000 ml. $H_2O$ and converted into basic zirconyl carbonate suspension by $Na_2CO_3$ addition (about 195.0200.0 g required) until a constant pH=8.5–9.0 was achieved.

Composite pigment was produced by adding the basic zirconyl carbonate suspension to the ZnO suspension, stirring the mixed suspension for approximately 30 minutes at 40°–50° C. and by subsequent introduction into it, in about 30 minutes, of 120.0 g. (2.85 moles) $H_2NCN$ (as 25% solution).

The conversion process was finalized by keeping the same conditions for an additional hour, after which the solid phase was separated by filtration, washed to salt free conditions and further processed in similar fashion as described in the applicable section of Example 1.

Pertinent analytical data are presented below:

TABLE 6

| Analyzed/Tested Parameter | Determined Values |
| --- | --- |
| Specific Gravity | 2.84 |
| N % | 16.58 |
| Zn % | 43.83 |
| carbonate as $Co_3$ % | 5.92 |
| carbonate as $ZrO(OH)(CO_3)_{0.5}$ % | 30.4 |
| Yield: | 391.1 |

Based on the above disclosed analytical data, the synthesized composite pigment's chemical composition corresponds to: $0.33ZrO(OH)(CO_3)_{0.5}/ZnNCN.0.13$ $ZnO.0.07H_2O$.

Example 7

Composite pigments, containing basic zinc cyanamide as active component, corresponding to phase composition formulas:

7.1 HY Zeolite/basic zinc cyanamide (T)

7.2 Diatomaceous silica/basic zinc cyanamide (T), were produced pursuant essentially to the procedure disclosed in Example 1, except that the employed raw material molar ratios were as follows:

TABLE 7

| | Amounts in grams per synthesized products | |
| --- | --- | --- |
| Raw Materials | 7.1 | 7.2 |
| ZnO(AzO 66 grade) | 178.0 | 178.0 (2.18 moles) |
| $H_2NCN$ (SKW, Germany) | 48.0 | 48.0 (1.14 moles) |
| HY Zeolite (CBV-760 from the PQ Corp.) | 165.0 | — |
| Diatomaceous Silica (Ultra Block grade from Eagle Picher Minerals, Inc.) | — | 165.0 |

Pertinent analytical data are presented below:

TABLE 8

| Phase Composition of Synthesized | Determined/Calculated Values of Quality Parameters | | | |
| --- | --- | --- | --- | --- |
| No. Pigments | N % | Zn % | Support % | Specific Gravity |
| 7.1 HY Zeolite/Basic ZnNCN(T) | 7.1 | 39.02 | 43.7 | 2.45 |
| 7.2 Silica/basic ZnNCN(T) | 7.83 | 38.18 | 44.0 | 2.58 |

Yields recovered and the correspondent chemical compositions (based on the above presented analytical data) are given below:

| Chemical Composition of Synthesized Pigments | | Yield, g. |
| --- | --- | --- |
| 7.1 | 43.4% Zeolite HY/ZnNCN. $1.35ZnO.1.6H_2O$ | 380.0 |
| 7.2 | 44% Silica/ZnNCN. $1.08ZnO.1.31H_2O$ | 375.0 |

Example 8

Composite pigment containing basic zinc cyanamide as active component, corresponding to phase composition of hydrated zirconyl oxide/basic ZnNCN was obtained essentially the same way in all details as disclosed in Example 7, except that in this case the support constituent was prepared by precipitating dissolved zirconyl species as $Zr(OH)_2.H_2O_x$.

TO that purpose 415.0 g. of zirconyl sulfate (see also Example 6), dissolved in 1,500 ml. $H_2O$ was converted into $ZrO(OH)_2.H_2Ox$ suspension by 210.0 g. (5.25 moles) of NaOH addition to a stable pH=8.59.0, subsequently incorporated into composite pigment and further processed as described in Example 7, respectively, in Example 1.

Pertinent analytical data are presented below:

TABLE 9

| Analyzed/Tested Parameter | Determined Values |
| --- | --- |
| Specific Gravity | 3.28 |
| N % | 7.8 |

TABLE 9-continued

| Analyzed/Tested Parameter | Determined Values |
|---|---|
| Zn % | 36.0 |
| Basic Zinc Cyanamide % | 56.39 |
| Substrate % | 43.6 |
| Yield: | 410.0 g. |

Based on the above disclosed data, the synthesized pigment's chemical composition corresponds to:

$1.07 \cdot ZrO_2 \cdot 2.5H_2O/ZnNCN \cdot 0.97\ (ZnO \cdot H_2O)$.

Example 9

Composite pigments comprising basic zinc cyanamide as active component, zirconyl or titanyl phosphate as support constituent and corresponding to phase composition formulas of:

9.1 $Zr(HPO_4)_2$/Basic ZnNCN(T)
9.2 $Ti(HPO_4)_2$/Basic ZnNCN(T) were produced essentially in similar fashion as presented in Example 7, except that in these cases the support constituents were prepared according to as follow:

Zirconyl sulfate (9.1) or Titanyl sulfate (9.2) solution was obtained by solubilizing 223.0 g. of the former (available from Magnesium Electron, Inc., with an assay of 32% $ZrO_2$) or 650.0 g. the latter (available from Kemira, Inc., with an assay of 9.8% $TiO_2$) product, respectively, in approximately 2,000 ml.$H_2O$.

Consecutively $Zr(HPO_4)_2 \cdot H_2O_x$ or $Ti(HPO_4)_2 \cdot H_2O_x$ aqueous suspensions were produced by introducing, under intense agitation 170.0 g. (1.47 moles) of $H_3PO_4$ (as 40% solution) into each solution and by further NaOH addition to a stable pH=8.0–9.0.

The incorporation of the support constituents into the correspondent composite pigments 9.1 and 9.2, respectively, was subsequently performed in all details as described in Example 7, including washing the products to salt-free conditions as described in Example 1.

Related analytical data are presented below:

TABLE 10

| No. | Phase Composition of Synthesized Pigments | N % | Zn % | Support % | Specific Gravity |
|---|---|---|---|---|---|
| 9.1 | $Zr(HPO_4)_2$/Basic ZnNCN(T) | 7.94 | 36.14 | 43.37 | 2.80 |
| 9.2 | (Ti) $(HPO_4)_2$/Basic ZnNCN(T) | 7.54 | 34.65 | 47.0 | 2.73 |

Yield, IR spectrum relevant to 9.1 and the correspondent chemical compositions (based on the above presented analytical data) are shown below, respectively, in FIG. 5.

| Chemical Composition of Synthesized Pigments | Yield, g. |
|---|---|
| 9.1 $2.04Zr(HPO_4)_2 \cdot 0.38H_2O/ZnNCN \cdot 0.95$ $(ZnO \cdot H_2O)$ | 395.0 |
| 9.2 $2.96Ti(HPO_4)_2 \cdot 0.2H_2O/ZnNCN \cdot 0.96$ $(ZnO \cdot H_2O)$ | 415.0 |

Example 10

Composite pigment based on ZnNCN and three component mixed support constituent according to the phase composition formula of Ce carbonate, basic (Zn +Zr) carbonate/ZnNCN(A-T), was prepared pursuant to the following procedure.

Previously prepared (see pertinent and applicable section of Example 1) well dispersed, hydrated and reactive ZnO suspension, containing 300.0 g. (3.68 moles) of such product in 1,000 ml. $H_2O$, was converted in mixed suspension of hydroxides (precursors to cerium carbonate, basic zirconyl carbonate, basic zinc carbonate mixture) by first cooling it to 40°–50° C. then introducing into it 125 0 g of zirconyl sulfate (as specified in Example 9), 140.0 g. of $Ce(NO_3)_3$ (from Molycorp, Inc., characterized by assay of 34.5% $CeO_2$) and after approximately 10 minutes, 83.0 g. of NaOH (2.07 moles) under intensive agitation.

Carbonization of the mixed suspension of hydroxides was subsequently performed by introducing continuously into the intensively stirred reaction medium, at 25°–35° C. $CO_2$ gas at a manageable rate for about one hour.

Composite pigment, according to the phase composition formula above disclosed, was obtained by introducing consequently, in about 30 minutes 141.0 g. of $H_2NCN$ (3.36 moles, as 25% aqueous solution) into the reaction medium and finalizing the conversion process by agitation at 25°–40° C., in about two hours.

The obtained composite pigment was subsequently processed as described in the applicable section of Example 6, inclusively washing it to salt-free conditions.

Related analytical data are presented below:

TABLE 11

| Analyzed/Tested Parameter | Determined Values |
|---|---|
| Specific Gravity | 2.82 |
| N % | 15.91 |
| Zn % | 47.66 |
| Total $CO_3$ % (as $CO_3$) | 5.6 |
| ZnNCN % | 59.9 |
| Support % | 40.1 |
| Yield: | 510.0 g. |

Example 11

A typical water based, stain blocking primer formulation (designed for wood protection) employed as test system (applied on redwood panels) pursuant to the present invention is presented below:

TABLE 12

| Components | Trade Names of Components | Parts by Weight |
|---|---|---|
| Stain Blocking Composite Pigment | Produced according to the present invention* | 33.0 |
| $TiO_2$ | — | 300.0 |
| Dispersant | Tamol 681 (1) | 20.0 |
| Stabilizer | Triton CF-10 (2) | 2.0 |
| Thickener | QR-708 (1) | 6.0 |
| Anti-foam Agent | Foamaster VL (3) | 2.0 |
| Ammonia, 28% | — | 1.0 |
| Coalescent Solvents | Ethylene Glycol | 20.0 |
| | Texanol (4) | 5.0 |
| Resin | Rhoplex MV-23 (1) | 520.0 |
| Water | — | 200.0 |

*except commercial products

Suppliers of components are: (1) Rohm & Haas, (2) Union Carbide, (3) Henkel Co., and (4) Eastman Chemical Co.

Following the test procedure earlier described, tannin stain blocking activity of various composite pigments (synthesized pursuant to the present invention and employed as functional components of the test formulation disclosed above in Table 12) was determined on redwood panels; pertinent results are presented in Table 13.

ΔE values measured, which qualify the magnitude of the observed color shifts, are also inversely proportional with the tested pigments' stain blocking activity.

The above disclosed ΔE values (observe control and commercial products for comparison) indicate remarkable tannin stain blocking activity of pigment grade ZnNCN and basic ZnNCN, as well as synergistic behavior, in the same sense, of related pigment composites synthesized according to the present invention.

TABLE 13

| Tested Stain Blocking Pigments | | Related Tannin Stain Blocking |
|---|---|---|
| According to Example # | Phase Composition | Activity, Measured as ΔE |
| Control, without stain blocker* | N.A. | 18.0 |
| 1.1 | $Ce_2(CO_3)3.3H_2O$/ ZnNCN(T) | 7.0 |
| —** | ZnNCN(T) | 9.5 |
| 4. | $ZnNCN.ZnO.H_2O$(T) | 9.0 |
| 5. | Basic Zinc Carbonate/basic ZnNCN(A-T) | 7.5 |
| 9.1 | $Zr(HPO_4)_2$/basic ZnNCN(T) | 6.5 |
| 1.2 | $Al(OH)_3$/ZnNCN(T) | 8.5 |
| 1.3 | Zeolite/ZnNCN(T) | 8.0 |
| Commercial Product | Borate Based | 10.5 |
| Commercial Product | Phosphate/Silicate Based | 12.0 |

*Compensated for by the same amounts of $TiO_2$.
**Produced according to U.S. Pat. No. 5,176,894.

Example 12

Fungus growth retarding activity of pigment grade ZnNCN was evaluated following the recommendations of the specialized test procedure by ASTM-3273.

For that purpose, variations of paint formulation (as presented in Table 12) containing pigment grade ZnNCN (produced according to U.S. Pat. No. 5,176,894) borate based stain blocker pigment (available commercially, also recommended as fungicide in paint formulations) and control formulation without stain blocker, respectively, were applied on pine and gypsum substrates and subjected to test conditions.

The extent of discoloration caused by fungal growth on the test coatings' surfaces, an indicator of the tested products' inhibitive activity, was visually evaluated and graded on a 10 (no disfiguration) to 1 (no fungus growth inhibition) scale.

Pertinent results presented below indicate the manifestation of a remarkable fungus growth control activity for pigment grade ZnNCN.

TABLE 14

| | Grade of Fungus Growth Inhibition on Substrates of: | |
|---|---|---|
| Inhibitor | Pine | Gypsum |
| None(control formulation) | 2 | 2 |
| Modified Ba-metaborate | 3 | 1 |
| ZnNCN | 7 | 7 |

The foregoing is considered as illustrative only of the principles of the invention, since numerous modifications and changes will be apparent to those skilled in the art. The invention should not be considered to be limited to the exact compositions shown and described, and accordingly all suitable modifications and equivalents may be resorted to falling within the true scope of the invention.

What is claimed is:

1. A process of inhibiting the staining of a film-forming finish applied to a tannin-containing wood substrate which comprises the step of applying to the wood substrate prior to or concurrently with the film forming finish, a protective coating containing zinc cyanamide in an amount effective to inhibit the migration of tannins from said substrate into said finish.

2. A process according to claim 1 wherein said composition also contains basic zinc carbonate.

3. A process according to claim 1 wherein said zinc cyanamide is applied in the form of an aqueous suspension.

4. A process according to claim 1 wherein said protective coating also contains a metallic oxide or hydroxide.

5. A process of inhibiting of the staining of a film forming finish applied to a tannin containing wood substrate which comprises the step of applying to the wood substrate prior to or concurrently with the film forming finish, a protective coating containing an effective amount of $ZnNCN.ZnO.H_2O$ to inhibit the migration of tannins from said substrate into said finish and to inhibit fungal growth.

6. A process according to claim 5 wherein said protective coating also contains a synergistic support constituent.

7. A stain blocking, fungal growth inhibiting coating composition for protecting paint coatings from stains on a substrate comprising at least one white colored stain blocking component selected from the group consisting of zinc cyanamide, calcium cyanamide, magnesium cyanamide, strontium cyanamide, zinc carbonate, cerium carbonate, zirconium carbonate, calcium carbonate, strontium carbonate, zirconium phosphate and titanium phosphate and a synergistically effective amount, not exceeding 50% by weight of said composition, of a synergistic support constituent.

8. A composition according to claim 7 wherein zinc cyanamide comprises about 3 to 50 percent by weight of the composition.

9. A composition according to claim 8 wherein said synergistic support constituent is selected from the group consisting of a basic carbonate of zinc, zirconium, cerium, lanthanum, calcium or strontium.

10. A composition according to claim 8 wherein said synergistic support constituent comprises a zeolite or molecular sieve characterized by large intersecting pore structures and having high absorptive capacity.

11. A composition according to claim 8 wherein said synergistic support constituent comprises a partially or totally dehydrated oxide of Zr, Al, Si or Zn.

12. A composition according to claim 8 wherein said synergistic support constituent comprises a hydrophosphate selected from the group consisting of $Zr(HPO_4)_2 \cdot xH_2O$, $Ti(HPO_4)_2 \cdot xH_2O$, and $Sr(HPO_4)_2 \cdot xH_2O$.

13. A composition according to claim 12 wherein said phosphate synergistic support constituent is formed in situ of a ZnO suspension to which $H_2NCN$ is subsequently added, by concurrent introduction of $H_3PO_4$ or $Na_3PO_4$ and a slurry or aqueous solution of a hydroxide, carbonate, or basic carbonate of Zr, Ti, or Sr.

* * * * *